(12) United States Patent
Henry et al.

(10) Patent No.: US 6,550,004 B1
(45) Date of Patent: Apr. 15, 2003

(54) HYBRID BRANCH PREDICTOR WITH IMPROVED SELECTOR TABLE UPDATE MECHANISM

(75) Inventors: G. Glenn Henry, Austin, TX (US); Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 0 days.

(21) Appl. No.: 09/434,984

(22) Filed: Nov. 5, 1999

(51) Int. Cl.$^7$ .................................................. G06F 9/32
(52) U.S. Cl. ........................................ 712/239; 712/236
(58) Field of Search ............................... 712/234, 236, 712/239, 240, 233

(56) References Cited

U.S. PATENT DOCUMENTS

| | | | |
|---|---|---|---|
| 5,687,360 A | * 11/1997 | Chang ........................ | 712/240 |
| 5,805,878 A | *  9/1998 | Rahman et al. .............. | 712/239 |
| 5,875,324 A | *  2/1999 | Tran et al. ................... | 712/238 |
| 5,978,909 A | * 11/1999 | Lempel ....................... | 712/240 |
| 6,088,793 A | *  7/2000 | Liu et al. .................... | 712/233 |

OTHER PUBLICATIONS

The Agree Predictor: A Mechanism for Reducing Negative Branch History Interference, Eric Sprangle, Robert S. Chappell, Mitch Alsup, Yale N. Patt.
Alternative Implementations of Hybrid Branch Predictors, Po–Yung Chang, Eric Hao, Yale N. Patt, 1995 IEEE Proceedings of Micro–28.
Pentium Processor Family Developer's Manual, vol. 3: Architecture and Programming Manual, 1995. Appendix D.

* cited by examiner

*Primary Examiner*—Eric Coleman
(74) *Attorney, Agent, or Firm*—E. Alan Davis; James W. Huffman

(57) ABSTRACT

A branch predictor for improving branch prediction accuracy is provided. The branch predictor includes global and local Agree dynamic branch predictors, one of which is selected for correlation with a static branch prediction made based upon a test type of a conditional branch instruction specifying a condition upon which the branch will be taken. In one embodiment, the selection is made by correlating a selection prediction made the static predictor based on the test type and an Agree prediction made by a selector history table based on the branch instruction address. In an alternate embodiment, the selection is made directly by the selector history table, without the benefit of the static prediction. In addition, the static predictor makes its predictions based upon an opcode of an instruction preceding the conditional branch instruction and upon a sign of a displacement for calculating a target address of the conditional branch instruction. The dynamic predictors are updated if they are selected and incorrectly predicted the outcome. The selector history table is updated if the selected dynamic predictor predicted incorrectly and the non-selected dynamic predictor predicted correctly.

52 Claims, 11 Drawing Sheets

FIG. 4

| | SELECTOR | STATIC PRED T/NT | STATIC PRED X/Y | PRED X | PRED Y | RESULT | | UPDATE X | UPDATE Y | UPDATE S |
|---|---|---|---|---|---|---|---|---|---|---|
| 1 | A | T | X | D | D | T | | A | --- | --- |
| 2 | A | T | X | D | D | NT | | --- | --- | --- |
| 3 | A | T | X | D | A | T | | A | --- | Y |
| 4 | A | T | X | D | A | NT | | --- | --- | --- |
| 5 | A | T | X | A | D | T | | --- | --- | --- |
| 6 | A | T | X | A | D | NT | | D | --- | Y |
| 7 | A | T | X | A | A | T | | --- | --- | --- |
| 8 | A | T | X | A | A | NT | | D | --- | --- |
| 9 | A | T | Y | D | D | T | | --- | A | --- |
| 10 | A | T | Y | D | D | NT | | --- | --- | --- |
| 11 | A | T | Y | D | A | T | | --- | --- | --- |
| 12 | A | T | Y | D | A | NT | | --- | D | X |
| 13 | A | T | Y | A | D | T | | --- | A | X |
| 14 | A | T | Y | A | D | NT | | --- | --- | --- |
| 15 | A | T | Y | A | A | T | | --- | --- | --- |
| 16 | A | T | Y | A | A | NT | | --- | D | --- |
| 17 | A | NT | X | D | D | T | | --- | --- | --- |
| 18 | A | NT | X | D | D | NT | | A | --- | --- |
| 19 | A | NT | X | D | A | T | | --- | --- | --- |
| 20 | A | NT | X | D | A | NT | | A | --- | Y |
| 21 | A | NT | X | A | D | T | | D | --- | Y |
| 22 | A | NT | X | A | D | NT | | --- | --- | --- |
| 23 | A | NT | X | A | A | T | | D | --- | --- |
| 24 | A | NT | X | A | A | NT | | --- | --- | --- |
| 25 | A | NT | Y | D | D | T | | --- | --- | --- |
| 26 | A | NT | Y | D | D | NT | | --- | A | --- |
| 27 | A | NT | Y | D | A | T | | --- | D | X |
| 28 | A | NT | Y | D | A | NT | | --- | --- | --- |
| 29 | A | NT | Y | A | D | T | | --- | --- | --- |
| 30 | A | NT | Y | A | D | NT | | --- | A | X |
| 31 | A | NT | Y | A | A | T | | --- | D | --- |
| 32 | A | NT | Y | A | A | NT | | --- | --- | --- |

FIG. 4 (Cont'd)

| | SELECTOR | STATIC PRED T/NT | STATIC PRED X/Y | PRED X | PRED Y | RESULT | UPDATE X | UPDATE Y | UPDATE S |
|---|---|---|---|---|---|---|---|---|---|
| 33 | D | T | X | D | D | T | --- | A | --- |
| 34 | D | T | X | D | D | NT | --- | --- | --- |
| 35 | D | T | X | D | A | T | --- | --- | --- |
| 36 | D | T | X | D | A | NT | --- | D | X |
| 37 | D | T | X | A | D | T | --- | A | X |
| 38 | D | T | X | A | D | NT | --- | --- | --- |
| 39 | D | T | X | A | A | T | --- | --- | --- |
| 40 | D | T | X | A | A | NT | --- | D | --- |
| 41 | D | T | Y | D | D | T | A | --- | --- |
| 42 | D | T | Y | D | D | NT | --- | --- | --- |
| 43 | D | T | Y | D | A | T | A | --- | Y |
| 44 | D | T | Y | D | A | NT | --- | --- | --- |
| 45 | D | T | Y | A | D | T | --- | --- | --- |
| 46 | D | T | Y | A | D | NT | D | --- | Y |
| 47 | D | T | Y | A | A | T | --- | --- | --- |
| 48 | D | T | Y | A | A | NT | D | --- | --- |
| 49 | D | NT | X | D | D | T | --- | --- | --- |
| 50 | D | NT | X | D | D | NT | --- | A | --- |
| 51 | D | NT | X | D | A | T | --- | D | X |
| 52 | D | NT | X | D | A | NT | --- | --- | --- |
| 53 | D | NT | X | A | D | T | --- | --- | --- |
| 54 | D | NT | X | A | D | NT | --- | A | X |
| 55 | D | NT | X | A | A | T | --- | D | --- |
| 56 | D | NT | X | A | A | NT | --- | --- | --- |
| 57 | D | NT | Y | D | D | T | --- | --- | --- |
| 58 | D | NT | Y | D | D | NT | A | --- | --- |
| 59 | D | NT | Y | D | A | T | --- | --- | --- |
| 60 | D | NT | Y | D | A | NT | A | --- | Y |
| 61 | D | NT | Y | A | D | T | D | --- | Y |
| 62 | D | NT | Y | A | D | NT | --- | --- | --- |
| 63 | D | NT | Y | A | A | T | D | --- | --- |
| 64 | D | NT | Y | A | A | NT | --- | --- | --- |

FIG. 5

| | PRED X | PRED Y | STATIC PRED X/Y | SELECTOR | UPDATE X | UPDATE Y | UPDATE S |
|---|---|---|---|---|---|---|---|
| 1 | correct | correct | X | A | --- | --- | --- |
| 2 | correct | correct | X | D | --- | --- | --- |
| 3 | correct | correct | Y | A | --- | --- | --- |
| 4 | correct | correct | Y | D | --- | --- | --- |
| 5 | correct | wrong | X | A | --- | --- | --- |
| 6 | correct | wrong | X | D | --- | YES | YES |
| 7 | correct | wrong | Y | A | --- | YES | YES |
| 8 | correct | wrong | Y | D | --- | --- | --- |
| 9 | wrong | correct | X | A | YES | --- | YES |
| 10 | wrong | correct | X | D | --- | --- | --- |
| 11 | wrong | correct | Y | A | --- | --- | --- |
| 12 | wrong | correct | Y | D | YES | --- | YES |
| 13 | wrong | wrong | X | A | YES | --- | --- |
| 14 | wrong | wrong | X | D | --- | YES | --- |
| 15 | wrong | wrong | Y | A | --- | YES | --- |
| 16 | wrong | wrong | Y | D | YES | --- | --- |

FIG. 8

|  | STATIC PRED T/NT | SELECTOR | PRED X | PRED Y | RESULT | UPDATE X | UPDATE Y | UPDATE S |
|---|---|---|---|---|---|---|---|---|
| 1 | T | X | D | D | T | A | --- | --- |
| 2 | T | X | D | D | NT | --- | --- | --- |
| 3 | T | X | D | A | T | A | --- | Y |
| 4 | T | X | D | A | NT | --- | --- | --- |
| 5 | T | X | A | D | T | --- | --- | --- |
| 6 | T | X | A | D | NT | D | --- | Y |
| 7 | T | X | A | A | T | --- | --- | --- |
| 8 | T | X | A | A | NT | D | --- | --- |
| 9 | T | Y | D | D | T | --- | A | --- |
| 10 | T | Y | D | D | NT | --- | --- | --- |
| 11 | T | Y | D | A | T | --- | --- | --- |
| 12 | T | Y | D | A | NT | --- | D | X |
| 13 | T | Y | A | D | T | --- | A | X |
| 14 | T | Y | A | D | NT | --- | --- | --- |
| 15 | T | Y | A | A | T | --- | --- | --- |
| 16 | T | Y | A | A | NT | --- | D | --- |
| 17 | NT | X | D | D | T | --- | --- | --- |
| 18 | NT | X | D | D | NT | A | --- | --- |
| 19 | NT | X | D | A | T | --- | --- | --- |
| 20 | NT | X | D | A | NT | A | --- | Y |
| 21 | NT | X | A | D | T | D | --- | Y |
| 22 | NT | X | A | D | NT | --- | --- | --- |
| 23 | NT | X | A | A | T | D | --- | --- |
| 24 | NT | X | A | A | NT | --- | --- | --- |
| 25 | NT | Y | D | D | T | --- | --- | --- |
| 26 | NT | Y | D | D | NT | --- | A | --- |
| 27 | NT | Y | D | A | T | --- | D | X |
| 28 | NT | Y | D | A | NT | --- | --- | --- |
| 29 | NT | Y | A | D | T | --- | --- | --- |
| 30 | NT | Y | A | D | NT | --- | A | X |
| 31 | NT | Y | A | A | T | --- | D | --- |
| 32 | NT | Y | A | A | NT | --- | --- | --- |

FIG. 9

| | PRED X | PRED Y | SELECTOR | | UPDATE X | UPDATE Y | UPDATE S |
|---|---|---|---|---|---|---|---|
| 1 | correct | correct | X | | --- | --- | --- |
| 2 | correct | correct | Y | | --- | --- | --- |
| 3 | correct | wrong | X | | --- | --- | --- |
| 4 | correct | wrong | Y | | --- | YES | YES |
| 5 | wrong | correct | X | | YES | --- | YES |
| 6 | wrong | correct | Y | | --- | --- | --- |
| 7 | wrong | wrong | X | | YES | --- | --- |
| 8 | wrong | wrong | Y | | --- | YES | --- |

HYBRID BRANCH PREDICTOR WITH IMPROVED SELECTOR TABLE UPDATE MECHANISM

BACKGROUND OF THE INVENTION

1. Field of the Invention

This invention relates in general to the field of pipelined microprocessor architecture, and more particularly to the prediction of conditional branch instruction outcomes.

2. Description of the Related Art

Computer instructions are typically stored in successive addressable locations within a memory. When processed by a Central Processing Unit (CPU), the instructions are fetched from consecutive memory locations and executed. Each time an instruction is fetched from memory, a program counter, or instruction pointer, within the CPU is incremented so that it contains the address of the next instruction in the sequence. This is the next sequential instruction pointer, or NSIP. Fetching of an instruction, incrementing of the program counter, and execution of the instruction continues linearly through memory until a program control instruction is encountered.

A program control instruction, when executed, changes the address in the program counter and causes the flow of control to be altered. In other words, program control instructions specify conditions for altering the contents of the program counter. The change in the value of the program counter as a result of the execution of a program control instruction causes a break in the sequence of instruction execution. This is an important feature in digital computers, as it provides control over the flow of program execution and a capability for branching to different portions of a program. Examples of program control instructions include Jump, Test and Jump conditionally, Call, and Return.

A Jump instruction causes the CPU to unconditionally change the contents of the program counter to a specific value, i.e., to the target address for the instruction where the program is to continue execution. A Test and Jump conditionally causes the CPU to test the contents of a status register, or possibly compare two values, and either continue sequential execution or jump to a new address, called the target address, based on the outcome of the test or comparison. A Call instruction causes the CPU to unconditionally jump to a new target address, but also saves the value of the program counter to allow the CPU to return to the program location it is leaving. A Return instruction causes the CPU to retrieve the value of the program counter that was saved by the last Call instruction, and return program flow back to the retrieved instruction address.

In early microprocessors, execution of program control instructions did not impose significant processing delays because such microprocessors were designed to execute only one instruction at a time. If the instruction being executed was a program control instruction, by the end of execution the microprocessor would know whether it should branch, and if it was supposed to branch, it would know the target address of the branch. Thus, whether the next instruction was sequential, or the result of a branch, it would be fetched and executed.

Modern microprocessors are not so simple. Rather, it is common for modern microprocessors to operate on several instructions at the same time, within different blocks or pipeline stages of the microprocessor. Hennessy and Patterson define pipelining as, "an implementation technique whereby multiple instructions are overlapped in execution." *Computer Architecture: A Quantitative Approach,* $2^{nd}$ edition, by John L. Hennessy and David A. Patterson, Morgan Kaufmann Publishers, San Francisco, Calif., 1996. The authors go on to provide the following excellent illustration of pipelining:

> A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line.

Thus, as instructions are fetched, they are introduced into one end of the pipeline. They proceed through pipeline stages within a microprocessor until they complete execution. In such pipelined microprocessors it is often not known whether a branch instruction will alter program flow until it reaches a late stage in the pipeline. However, by this time, the microprocessor has already fetched other instructions and is executing them in earlier stages of the pipeline. If a branch causes a change in program flow, all of the instructions in the pipeline that followed the branch must be thrown out. In addition, the instruction specified by the target address of the branch instruction must be fetched. Throwing out the intermediate instructions, and fetching the instruction at the target address creates processing delays in such microprocessors.

To alleviate this delay problem, many pipelined microprocessors use branch prediction mechanisms in an early stage of the pipeline that predict the outcome of branch instructions, and then fetch subsequent instructions according to the branch prediction.

A popular branch prediction scheme uses a branch history table (BHT), or prediction history table (PHT), to make predictions about conditional branch instruction outcomes. One simple BHT is an array of single bits. Each bit stores the last outcome of a branch instruction. For example, the bit stores a 1 if the branch was taken the last time it was executed and a 0 if the branch was not taken the last time it was executed.

The array is indexed by the address of the branch instruction. To make a prediction for a branch instruction, a branch predictor takes the address of the branch instruction and outputs the bit from the array entry selected by the address. Thus, the prediction for a given execution of a branch instruction is the outcome of the previous execution of the branch instruction. After the branch instruction executes (i.e., once the microprocessor resolves whether the branch is taken or not) the bit indexed by the branch instruction address is updated with the actual branch instruction outcome. A branch prediction mechanism such as a branch history table is commonly referred to as a dynamic branch prediction mechanism because it keeps a history of the outcome of branch instructions as a program executes and makes predictions based upon the history.

Many computer systems today have memory address ranges on the order of gigabytes. It is not practical for the BHT to be as large as the memory space of the system in which the microprocessor operates. Common BHT sizes are 1 KB to 4 KB. Therefore, only a portion of the address branch instruction is used to index into the BHT. Typically, the lower address bits are used as the index. Consequently, sometimes two or more branch instructions will index into the same location in the BHT. This phenomenon is commonly referred to as aliasing. This phenomenon occurs similarly in caches. However, most BHT's do not have cache tags and sets. Therefore, the outcome of the newer branch will replace the outcome of the older branch. This may be detrimental if the older branch executes next, rather than the newer branch.

The aliasing phenomenon is also referred to as PHT interference, since the outcome of one branch is interfering with the subsequent prediction of another completely unrelated branch. See Eric Spangle, Robert S. Chappell, Mitch Alsup, Yale N. Patt, "The Agree Predictor: A Mechanism for Reducing Negative Branch History Interference", Proceedings of the 24th International Symposium on Computer Architecture, Denver, June 1997, which is hereby incorporated by reference.

Spangle defines interference as "a branch accessing a PHT entry that was previously updated by a different branch." He notes that interference may be positive, negative or neutral. A positive interference is one that causes a correct prediction that would otherwise have been a misprediction. A negative interference is one that causes a misprediction that would otherwise have been a correct prediction. A neutral interference is one that does not affect the correctness of the prediction. Spangle goes on to show that negative interference has a substantial impact on branch prediction accuracy overall.

Some solutions have attempted to reduce the number of interferences. One solution is to increase the size of the PHT. However, increasing the size of the PHT increases cost significantly because it requires a substantial additional amount of hardware.

Spangle proposes a solution to the interference problem that he refers to as "agree prediction." Agree prediction, rather than attempting to reduce the number of interferences, converts negative interferences to positive or neutral interferences. This is accomplished by storing different information in the PHT than the outcome of the last branch instruction.

The agree prediction scheme relies on a biasing bit. The biasing bit indicates a prediction of the outcome of the branch. However, unlike the PHT entries, the value of the biasing bit is not updated with each execution of the branch instruction. The biasing bit remains the same over the course of program execution.

With agree prediction, the bit stored in the PHT predicts whether or not the branch outcome will be correctly predicted by the biasing bit, rather than predicting the branch outcome itself. Essentially, the agree predictor predicts whether the branch outcome will "agree" with the biasing bit's prediction. Thus, each time a branch is resolved, the PHT is updated with an indication of whether the biasing bit agreed with the actual outcome.

U.S. Pat. No. 6,247,122, entitled Method and Apparatus for Performing Branch Prediction Combining Static and Dynamic Predictors, having the same assignee and inventors, and hereby incorporated by reference, describes a branch prediction method that employs a static prediction based on the test type in the opcode of a conditional branch instruction specifying a condition upon which the conditional branch instruction will be taken as a biasing bit for correlation with a single agree dynamic branch predictor.

Another branch prediction scheme that has been proposed is a hybrid branch prediction scheme. See Po-Yung Chang, Eric Hao and Yale N. Patt, "Alternative Implementations of Hybrid Branch Predictors", Proceedings of MICRO-28, 1995, which is hereby incorporated by reference, for a detailed discussion of hybrid branch predictors.

A hybrid branch prediction scheme employs multiple individual branch prediction schemes to make predictions about the outcome of a branch instruction in parallel, and attempts to select or predict which of the multiple schemes will make the correct prediction. A hybrid prediction scheme recognizes that different individual branch instructions within a given computer program may have different branch characteristics, and therefore different branch prediction schemes may be more accurate in predicting the branch outcome. For example, for some branch instructions, the best indication of any future outcome is the history of that particular branch instruction, commonly referred to as the local history. In contrast, for other branch instructions, the best indication of a future outcome is the history of other branch instructions within the program, commonly referred to as the global history. A hybrid prediction scheme attempts to capitalize on the variation in branch outcome characteristics by employing multiple individual branch prediction schemes, such as a local predictor and a global predictor, and selecting the appropriate individual prediction scheme on an instruction by instruction basis.

Chang describes a selection mechanism for selecting between two individual branch prediction schemes. The selection mechanism uses a Branch Predictor Selection Table (BPST) to select the individual branch prediction scheme. The BPST uses a BHT that is indexed as a function of the address of the branch instruction.

The Agree Predictor and hybrid predictor schemes alone provide improved performance. However, microprocessor pipeline depths continue to increase, resulting in more severe performance degradation when branches are mispredicted. This generates a demand for even greater branch prediction accuracy.

Therefore, what is needed is a branch prediction mechanism that combines the benefits of agree prediction and hybrid prediction to improve overall conditional branch instruction prediction.

SUMMARY

To address the above-detailed deficiencies, it is an object of the present invention to provide an apparatus that provides improved branch prediction accuracy. Accordingly, in attainment of the aforementioned object, it is a feature of the present invention to provide a branch prediction mechanism. The branch prediction mechanism includes a static predictor, that makes a static prediction of whether a conditional branch instruction will be taken based on a test type of the conditional branch instruction, and a multiplexer, having a selection input, that selects one of two agree/disagree predictions. The mechanism also includes a selector, coupled to the multiplexer, that provides a selection signal to the selection input. The static prediction is correlated with the selected agree/disagree prediction to predict whether the conditional branch instruction will be taken.

In another aspect, it is a feature of the present invention to provide a method for updating a branch history table used in generating an agree/disagree signal for correlation with a static selection signal selecting one of two predictions of an outcome of a conditional branch instruction. The method includes receiving an indication of whether each of the two predictions correctly predicted the outcome and updating the branch history table only if the selected one of the two predictions incorrectly predicted the outcome and the nonselected prediction correctly predicted the outcome. The updating comprises storing an agree value in the branch history table if the branch history table generated disagree and storing a disagree value if the branch history table generated agree.

In yet another aspect, it is a feature of the present invention to provide a branch prediction mechanism in a microprocessor. The mechanism includes a static predictor, that generates a static prediction of an outcome of a conditional branch instruction based on a test type of the conditional branch instruction specifying a condition upon which the conditional branch instruction will be taken, and first and second branch predictors, that generate first and second agree/disagree predictions with the static prediction. The mechanism further includes a selector, that selects one of the first and second agree/disagree predictions and correlation logic, that correlates the static prediction and a selected one of the first and second agree/disagree predictions selected by the selector.

In yet another aspect, it is a feature of the present invention to provide an apparatus for selecting one of two predictions of an outcome of a conditional branch instruction made by a branch prediction mechanism of a microprocessor. The apparatus includes a history table, for storing a plurality of agree/disagree indications, that provides one of the plurality of agree/disagree indications on an output in response to an address of the conditional branch instruction. The apparatus also includes a correlator, coupled to the history table, for correlating a biasing bit signal generated by the branch prediction mechanism with the agree/disagree indication provided on the history table output to generate a selection signal for selecting one of the two predictions.

In yet another aspect, it is a feature of the present invention to provide an apparatus for selecting one of a plurality of predictions of an outcome of a conditional branch instruction. The apparatus includes a static predictor, that receives a test type of a conditional branch instruction for specifying a condition upon which the conditional branch instruction will be taken and to generate a selection signal and a multiplexer, that selects one of the plurality of predictions as a function of the selection signal.

In yet another aspect, it is a feature of the present invention to provide a method for selecting one of a plurality of predictions of an outcome of a conditional branch instruction by a branch prediction mechanism within a microprocessor. The method includes receiving a test type of a conditional branch instruction specifying a condition upon which the conditional branch instruction will be taken and selecting one of a plurality of predictions of an outcome of the conditional branch instruction based on the test type.

An advantage of the present invention is that it provides the improved prediction accuracy benefits of selectively employing local and global dynamic predictors and the constructive aliasing benefits of an Agree predictor, without having to incur the added cost of a biasing bit table, since the biasing bits are generated by the static predictor based on the conditional branch instruction test type. Another advantage of the present invention is that it enjoys the improved constructive aliasing benefits of the Agree predictor in the selector history table, without having to incur the added cost of a biasing bit table, since the biasing bits are generated by the static predictor based on the conditional branch instruction test type.

BRIEF DESCRIPTION OF THE DRAWINGS

These and other objects, features, and advantages of the present invention will become better understood with regard to the following description, and accompanying drawings where:

FIG. 4 is a table illustrating operation of the selector update logic of FIG. 2 according to the present invention.

FIG. 5 is a table summarizing the table of FIG. 4 according to the present invention.

FIG. 8 is a table illustrating operation of the selector update logic of FIG. 8 according to the alternate embodiment of the present invention.

FIG. 9 is a table summarizing the table of FIG. 8 according to the alternate embodiment of the present invention.

DETAILED DESCRIPTION

Figure 1:
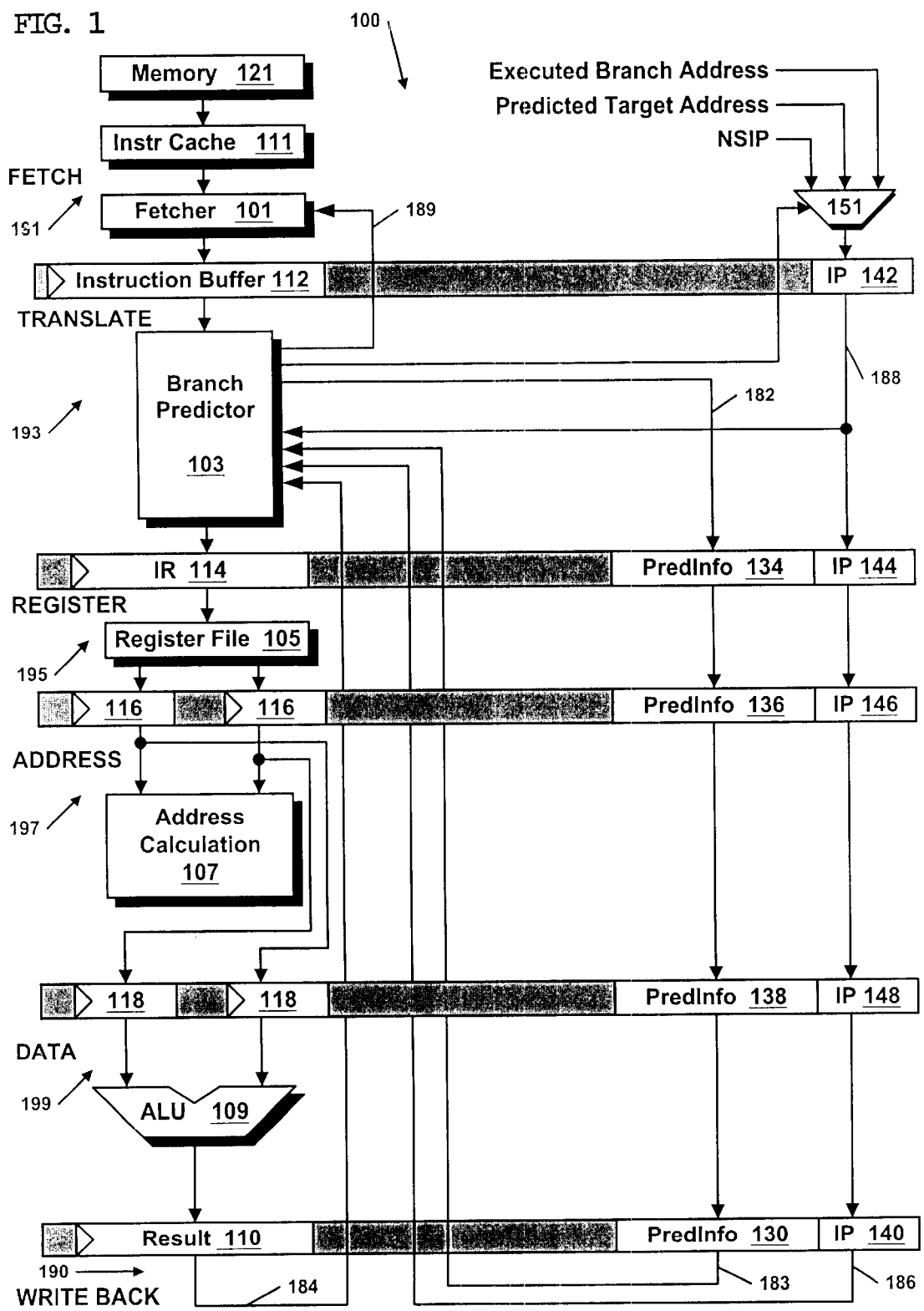
FIG. 1 is a block diagram of a pipelined microprocessor including a branch prediction mechanism according to the present invention.

Referring to FIG. 1, a block diagram of a pipeline microprocessor 100 according to the present invention is shown. The microprocessor 100 includes fetch 191, translate 193, register 195, address 197, data 199 and write back 190 stages coupled together to form a pipeline through which instructions are processed.

The fetch stage 191 includes a fetcher 101, which fetches macro instructions that are to be executed by the microprocessor 100 from an instruction cache 111 and memory 121. The fetcher 101 fetches instructions according to the contents of an instruction pointer (IP) 142 and places the instructions into an instruction buffer 112. Normally the IP 142 includes the value of a next sequential instruction pointer (NSIP), which is the address of the previous instruction plus the size of the previous instruction. However, when a branch instruction is taken, the executed branch target address is provided to the IP 142 to indicate the change in program flow effected by the branch instruction. Additionally, if it is predicted that a conditional branch instruction will be taken, the predicted target address of the branch instruction is provided to the IP 142. This enables the fetch stage 191 to fetch as the next instruction the instruction at the branch target address rather than the instruction in the next sequential memory location. A branch predictor 103 in the translate stage 193 controls the selection, via a multiplexer 151, of the contents to be loaded into the IP 142 based upon a prediction of whether a conditional branch instruction will be taken. Furthermore, the branch predictor 103 provides a signal 189 to the fetcher 101 to indicate the prediction of whether the conditional branch instruction will be taken or not taken.

The translate stage 193 translates or decodes the fetched macro instructions, such as conditional branch instructions, in the instruction buffer 112 into a sequence of micro operations, or micro instructions, that may be executed by the microprocessor 100. The micro instructions are placed into an instruction register (IR) 114. The translate stage 193 includes branch predictor 103 which makes predictions about the outcome of conditional branch instructions.

The branch predictor 103 receives the address of branch instructions from the IP 142 via signal 188 and makes a prediction of the outcome of the branch instruction based upon the branch instruction address. The branch instruction address is piped down with the branch instruction through the various stages of the pipeline via registers 144, 146, 148 and 140. The branch predictor 103 receives the branch instruction address, which was piped down along with the branch instruction, via signal 186 and uses the branch instruction address to update branch history tables within the branch predictor 103 described below. Preferably, the branch predictor 103 makes conditional branch instruction outcome predictions based upon dynamic branch predictions based upon branch history tables and also upon a static branch prediction based upon the conditional branch instruction test condition type, discussed in more detail below.

The branch predictor 103 indicates information relating to its prediction of the outcome of a conditional branch on signal 182. The prediction information is stored in a prediction information (PredInfo) register 134. The prediction information is piped down with the conditional branch instruction through the various stages of the pipeline via prediction information registers 136, 138 and 130. The prediction information is provided from the last prediction information register 130 in the pipeline to branch predictor 103 via signal 183 so that branch predictor 103 may use the prediction information and the branch outcome to determine if the prediction was correct and update the history tables accordingly.

The register stage 195 retrieves operands specified by the micro operations from a register file 105 for use by later stages in the pipeline. Preferably, the register file 105 includes a status flags register that is used in determining whether branch conditions have been satisfied.

The address stage 197 calculates memory addresses specified by micro operations, to be used in data storage and retrieval operations. In one embodiment, the branch target address of the branch instruction is calculated in the address stage 197 by address calculation unit 107. In another embodiment, the branch target address is calculated in the translate stage. For a description of branch target address calculation in the translate stage see U.S. patent application Ser. No. 08/962,344 entitled "Method and Apparatus for Branch Address Calculation During Decode" filed Oct. 31, 1997 by G. Glenn Henry and Terry Parks, which is hereby incorporated by reference.

The data/ALU stage 199 either performs ALU operations on data retrieved from the register file 105, or reads/writes data from/to memory using the memory address calculated in the address stage 197. The data/ALU stage 199 also resolves the outcomes of conditional branch instructions. That is, the data/ALU stage 199 determines whether or not the condition upon which the conditional branch instruction will be taken or not taken has been met. An example of a branch condition is whether or not a particular flag in a status register is set or clear, such as a carry flag or an overflow flag. The data/ALU stage 199 provides the result, or outcome, of the determination of the condition to a result register 110.

The write back stage 190 writes the result of a data read operation, or an ALU operation, to the register file or to a memory location. The write back stage 190 also provides the result of the conditional branch outcome to branch predictor 103 via signal 184. This enables branch predictor 103 to compare the outcome with the prediction information to determine if and how the history tables should be updated.

Figure 2:
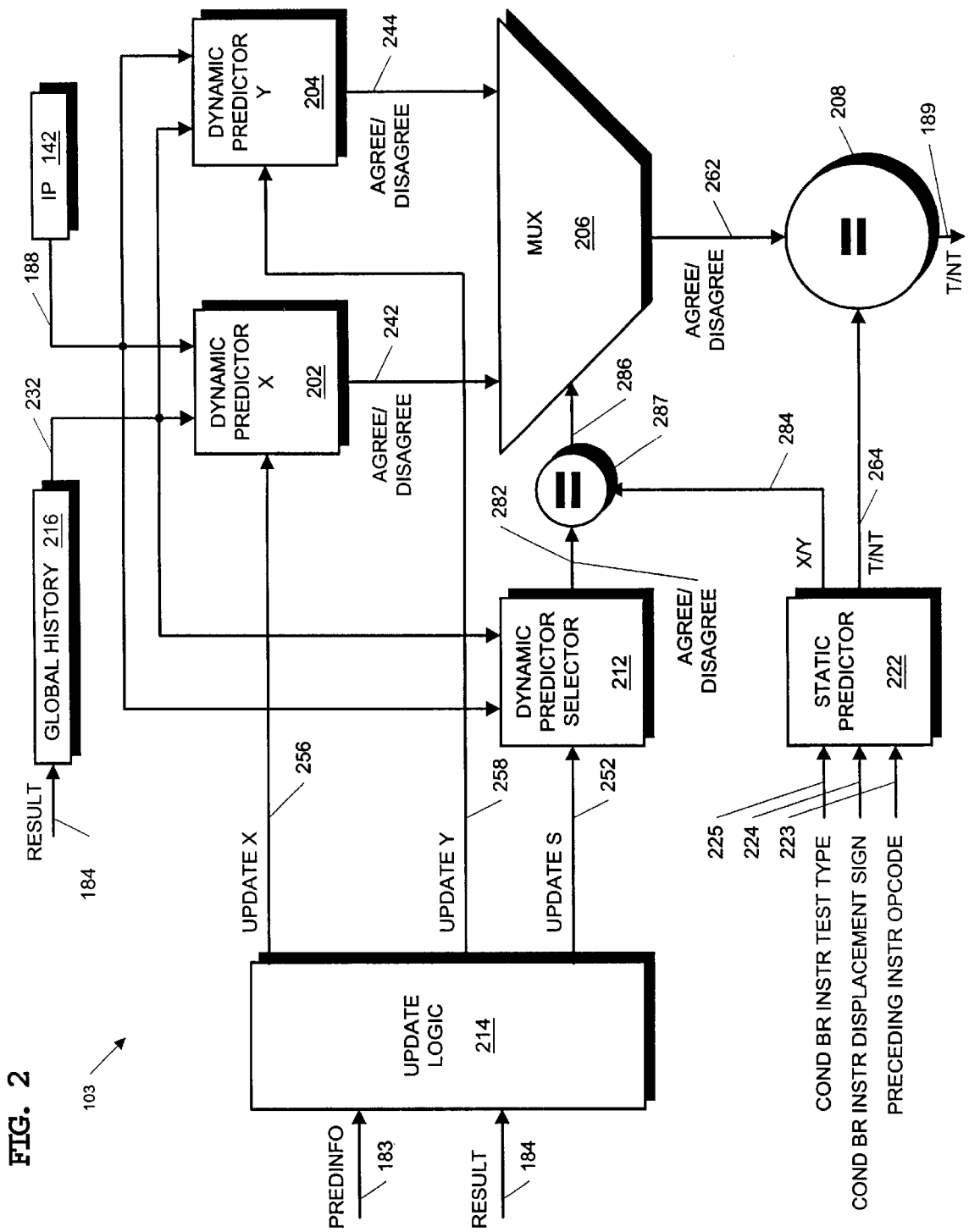
FIG. 2 is a detailed block diagram of the branch prediction mechanism of the microprocessor of FIG. 1 according to the present invention.

Referring now to FIG. 2, a block diagram showing in detail the branch predictor 103 of FIG. 1 is shown. Throughout the drawings, like elements are numbered identically for clarity and simplicity. The branch predictor 103 includes two dynamic branch predictors, referred to as dynamic predictor X 202 and dynamic predictor Y 204. The dynamic predictors 202 and 204 make predictions about the outcomes of conditional branch instructions based upon a history of conditional branch instruction outcomes stored in history tables, described in more detail with respect to FIG. 3. The dynamic predictors 202 and 204 receive an address of conditional branch instructions from the IP register 142 via signal 188. The dynamic predictors 202 and 204 also receive a global history of the most recent conditional branch instruction outcomes executed by the microprocessor 100 from global history register 216 via signal 232.

The dynamic predictors 202 and 204 generate Agree/Disagree prediction signals 242 and 244, respectively. Prediction signals 242 and 244 indicate a prediction of whether they agree or disagree with a static prediction of whether a conditional branch instruction will be taken or not taken. That is, prediction signals 242 and 244 indicate a prediction of whether the outcome of the conditional branch instruction made by a static predictor 222 on a T/NT (Taken/Not Taken) signal 264 is correct. The dynamic predictors 202 and 204 are described in more detail with respect to FIG. 3.

Figure 3:
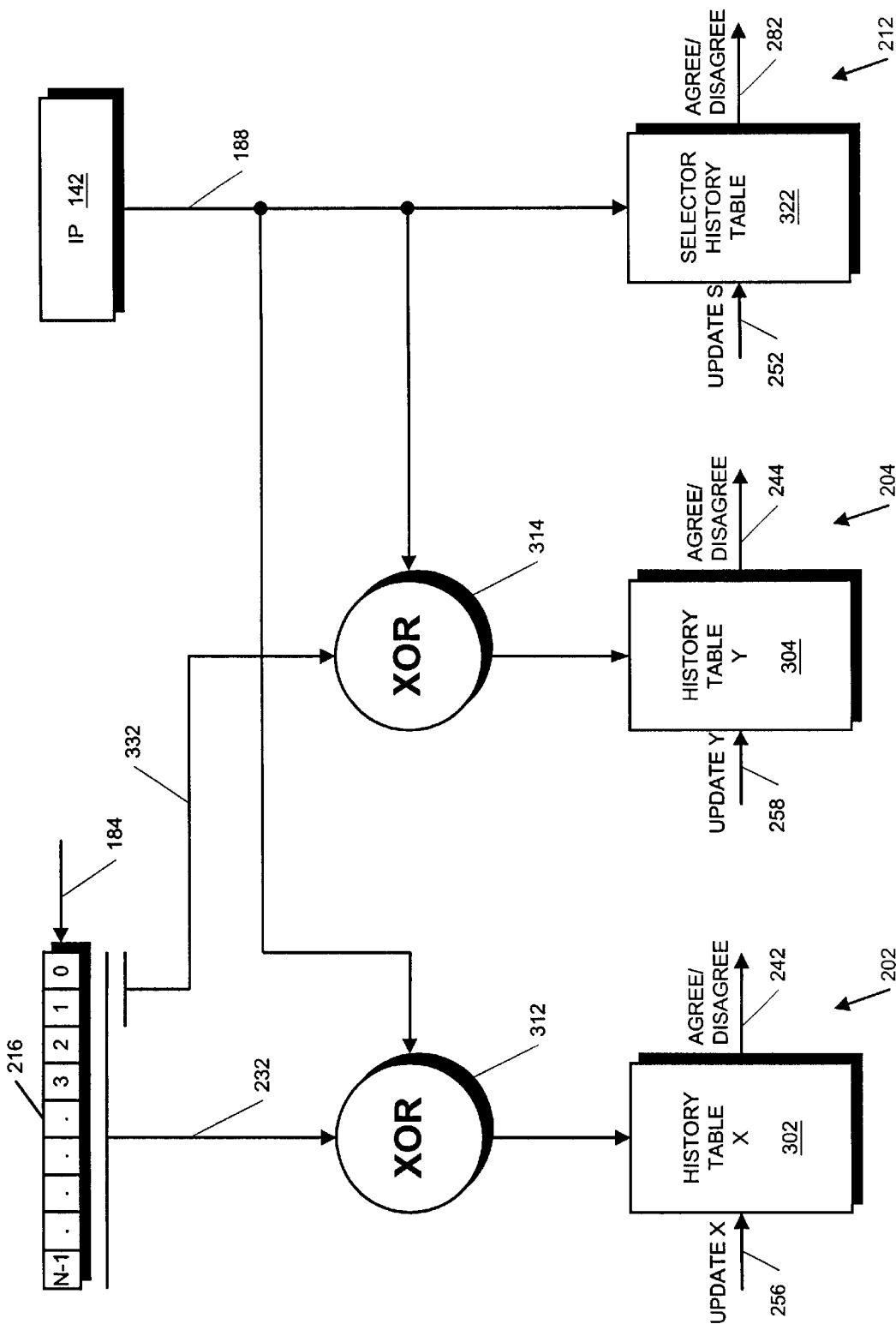
FIG. 3 is a detailed block diagram, including history tables, of the dynamic predictors and dynamic predictor selector of the branch prediction mechanism of FIG. 2 according to the present invention.

Referring briefly to FIG. 3, a block diagram illustrating in detail the dynamic predictors 202 and 204 of FIG. 2 is shown. The dynamic predictors 202 and 204 comprise history table X 302 and history table Y 304, respectively, coupled to index generation logic 312 and 314, respectively. Preferably, the index generation logic 312 and 314 comprise exclusive OR gates for hashing a portion of the address of the conditional branch instruction 188 and a portion of the global history 232 to generate an index into the history tables 302 and 304.

The global history signal 232 is provided by global history register 216. Global history register 216 comprises a shift register for storing the last N results of conditional branch instruction outcomes executed by the microprocessor 100. The global history register 216 receives the outcomes via result signal 184. In one embodiment, N is 12 and is equal to the number of address, or index, inputs to history table X 302.

History tables 302 and 304 each comprise an array of storage elements indexed by index generation logic 312 and 314. Each storage element stores a single Agree/Disagree bit. The Agree/Disagree bits are updated via update X signal 256 and update Y signal 258. The update of the Agree/Disagree bits is described in detail with respect to FIG. 4.

In the embodiment of FIG. 3, dynamic predictor X 202 is configured as a global dynamic predictor and dynamic predictor Y 204 is configured as a local dynamic predictor. That is, dynamic predictor X 202 is configured to hash the entire global history 232 in generating an index into the history table 302. Consequently, dynamic predictor X 202 is configured to more accurately predict conditional branch instructions which are more susceptible to prediction based upon the global history of outcomes of all recently executed conditional branch instructions of the executing program, rather than the local history of outcomes for only the conditional branch instruction currently being predicted. In contrast, dynamic predictor Y 204 is configured to hash only two bits of the global history 332 in generating an index into the history table 304. Consequently, dynamic predictor Y 204 is configured to more accurately predict conditional branch instructions which are more susceptible to prediction based upon the local history of outcomes of the conditional branch instruction currently being executed, rather than the global history of outcomes of all recently executed conditional branch instructions of the executing program. The selector history table 322 will be described in more detail below.

Referring again to FIG. 2, the branch predictor 103 also includes a multiplexer 206 that receives the two dynamic branch prediction signals 242 and 244 and selects one of the dynamic prediction signals 242 and 244 for generating a selected Agree/Disagree output signal 262 to a correlator 208. The multiplexer 206 selects one of the two dynamic branch prediction signals 242 and 244 to forward to output 262 based upon a selection input 286.

Correlator 208 correlates the static T/NT prediction 264 and the selected Agree/Disagree prediction 262 to generate final T/NT prediction signal 189 for provision to the macro instruction fetcher 101, as shown in FIG. 1. If the selected Agree/Disagree prediction 262 indicates Agree, then correlator 208 forwards static prediction 264 to final prediction output 189. However, if the selected Agree/Disagree prediction 262 indicates Disagree, then correlator 208 generates the inverse of static prediction 264 on final prediction output 189. Thus, static T/NT prediction 264 serves as a biasing bit for selected Agree/Disagree prediction 262.

Static predictor 222 receives three inputs and predicts the outcome of conditional branch instructions based upon the three inputs. One of the three inputs comprises a conditional branch instruction test type 225. The test type specifies a condition upon which the branch instruction will be taken or not taken. Preferably, the test type includes x86 conditional jump instruction (JCC) test types. In particular, the x86 conditional jump instruction test types include conditions based upon the carry, overflow, zero, parity and sign flags of the x86 FLAGS Register and various combinations thereof specified on pages D-1 and D-2 of the Intel Pentium Processor Family Developer's Manual Volume 3: Architecture and Programming Manual, 1995, which is hereby incorporated by reference.

A second of the three static predictor 222 inputs includes an opcode 223 (or indication thereof) of an instruction preceding the conditional branch instruction. The preceding instruction opcode is also selectively used in combination with the test type to predict the conditional branch instruction outcome, as described below.

A third of the three static predictor 222 inputs includes the sign of a displacement 224 for calculating a branch target address of the conditional branch instruction. The static predictor 222 makes static prediction 264 for some combinations of test types and preceding instruction opcodes based upon the displacement sign, as described below with respect to FIG. 4.

The static predictor 222 also uses the three inputs to make a static prediction via X/Y signal 284. Static prediction 284 predicts which of the two dynamic predictions 242 and 244 generated by dynamic predictors 202 and 204, respectively, will correctly predict the outcome of the conditional branch instruction.

The branch predictor 103 also includes a dynamic predictor selector 212 for use in selecting one of the two dynamic predictions 242 and 244 generated by dynamic predictors 202 and 204. The dynamic predictor selector 212 receives the global history signal 232 and conditional branch instruction address 188. Selector 212 generates an Agree/Disagree prediction 282 for agreeing or disagreeing with the static prediction 284. That is, Agree/Disagree prediction 282 predicts whether the static prediction 284 selected one of the dynamic predictors 202 and 204 correctly predicting the outcome of the conditional branch instruction. Thus, X/Y signal 284 serves as a biasing bit for Agree/Disagree prediction 282.

Referring briefly again to FIG. 3, the dynamic predictor selector 212 comprises a selector history table 322. The selector history table 322 comprises an array of storage elements for storing an Agree/Disagree bit, similar to history tables 302 and 304. In the embodiment of FIG. 3, the selector history table 322 is indexed by the conditional branch instruction address 188 provided by the IP 142. The selector history table 322 is updated via update S signal 252. The selector history table 322 generates an Agree/Disagree prediction via signal 282 for indicating agreement or disagreement with static X/Y prediction 284.

Referring again to FIG. 2, the dynamic predictor selector 212 Agree/Disagree prediction 282 and the static predictor 222 X/Y prediction signal 284 are correlated by a correlator 287 to generate a selection signal 286 to control multiplexer 206. If the selector prediction 282 indicates Agree, then correlator 287 forwards static X/Y prediction 282 to the multiplexer 206. However, if the selector prediction 282 indicates Disagree, then correlator 287 provides the inverse of static X/Y prediction 282 to the multiplexer 206.

The branch predictor 103 also includes update logic 214, coupled to the dynamic predictors 202 and 204 and the dynamic predictor selector 212. Once the outcome of the conditional branch instruction is determined, the history tables of dynamic predictors 202 and 204 and dynamic predictor selector 212 are updated by update logic 214 via update signals 256, 258 and 252, respectively. The update logic 214 receives the conditional branch instruction result 184 and prediction information 183 for use in determining whether to update the history tables.

The prediction information 183 comprises an indication of whether each of the dynamic predictors 202 and 204 correctly predicted the outcome of the conditional branch instruction and which of the dynamic predictors 202 and 204 was selected. Preferably, the prediction information 183 includes the TINT prediction 264 and X/Y prediction 284 of the static predictor 222, the Agree/Disagree prediction 282 of the dynamic predictor selector 212 and the Agree/Disagree predictions 242 and 244 of the dynamic predictors 202 and 204.

Referring now to FIG. 4, a table 400 illustrating operation of update logic 214 of FIG. 2 is shown. Table 400 is a truth table with six columns in the left-hand portion of the table 400 corresponding to prediction information input 183 and result input 184 of update logic 214. The three columns on the right-hand portion of table 400 correspond to outputs update S 252, update X 256 and update Y 258 of update logic 214. In table 400, "T" indicates Taken and "NT" indicates Not Taken; "A" indicates Agree and "D" indicates Disagree; "X" indicates dynamic predictor X 202 and "Y" indicates dynamic predictor Y 204. In table 400, "- - -" indicates no change to the corresponding history table.

The "RESULT" input column corresponds to the result, or outcome, of the conditional branch instruction indicated on result signal 184. The other five inputs comprise prediction information 183 according to one embodiment of the present invention.

The "SELECTOR" column indicates the value generated on signal 282 by selector 212. The "STATIC PRED T/NT" column indicates the prediction generated on T/NT signal 264 by static predictor 222. The "STATIC PRED X/Y" column indicates the prediction generated on X/Y signal 284 by static predictor 222. The "PRED X" column indicates the Agree/Disagree prediction generated by dynamic predictor x 202 on signal 242. The "PRED Y" column indicates the Agree/Disagree prediction generated by dynamic predictor Y 204 on signal 244.

The "UPDATE X" column indicates whether dynamic predictor X 202 history table 302 will be updated and if so with an Agree of Disagree value. The "UPDATE Y" column indicates whether dynamic predictor Y 204 history table 304 will be updated and if so with an Agree of Disagree value. The "UPDATE S" column indicates whether dynamic predictor selector 212 history table 322 will be updated and if so with an X or Y value.

Referring now to FIG. 5, a table 500 summarizing table 400 of FIG. 4 is shown. Similarly named columns correspond in FIGS. 4 and 5. As may be readily observed from tables 400 and 500, the update policy embodied in update logic 214 is according to the following two update rules. The update policy has been determined by the present inventors to advantageously yield improved branch prediction results.

First, if the selected dynamic predictor incorrectly predicts the conditional branch instruction outcome, then the selected dynamic predictor is updated. That is, the Agree/Disagree value stored in the dynamic predictor history table is toggled from its previous value. For example, in line 55 of table 400 the static predictor 222 predicted dynamic predictor X 202 and the selector 212 Disagreed with the static predictor 222, thus dynamic predictor Y 204 was selected by multiplexer 206. The static predictor 222 predicted Not Taken and dynamic predictor Y 204 Agreed with the static predictor 222, but the result was Taken. Thus, dynamic predictor Y 204 incorrectly predicted the outcome of the conditional branch instruction. Therefore, dynamic predictor Y 204 history table 304 is updated via update Y signal 258 with a Disagree value. Line 55 of table 400 is summarized in line 14 of table 500. It is noted that although dynamic predictor X 202 also incorrectly predicted the outcome, dynamic predictor X 202 history table 302 is not updated since dynamic predictor X 202 was not selected by multiplexer 206.

Second, the selector 212 history table 322 is updated only if the selected dynamic predictor incorrectly predicts the outcome and the non-selected dynamic predictor correctly predicts the outcome. That is, the X/Y value stored in the dynamic predictor selector 212 history table 322 is toggled from its previous value. For example, in line 20 of table 400 the static predictor 222 predicted dynamic predictor x 202 and the selector 212 Agreed with the static predictor 222, thus dynamic predictor X 202 was selected by multiplexer 206. The static predictor 222 predicted Not Taken and dynamic predictor X 202 Disagreed with the static predictor 222, but the result was Not Taken. Thus, dynamic predictor X 202 incorrectly predicted the outcome of the conditional branch instruction. However, dynamic predictor Y 204 Agreed with the static predictor 222. Thus, dynamic predictor Y 204 correctly predicted the outcome. Therefore, dynamic predictor selector 212 history table 322 is updated via update S signal 252 with a Y value. In line 20, history table 312 is also updated with an Agree value according to the first rule.

Line 20 of table 400 is summarized in line 9 of table 500. As may be observed, if both dynamic predictors predict incorrectly, or if both predict correctly, or if the selected dynamic predictor predicts correctly and the non-selected dynamic predictor predicts incorrectly, then the selector 212 is not updated, as shown for example in lines 1, 13 and 4, respectively, of table 500.

Figure 6:
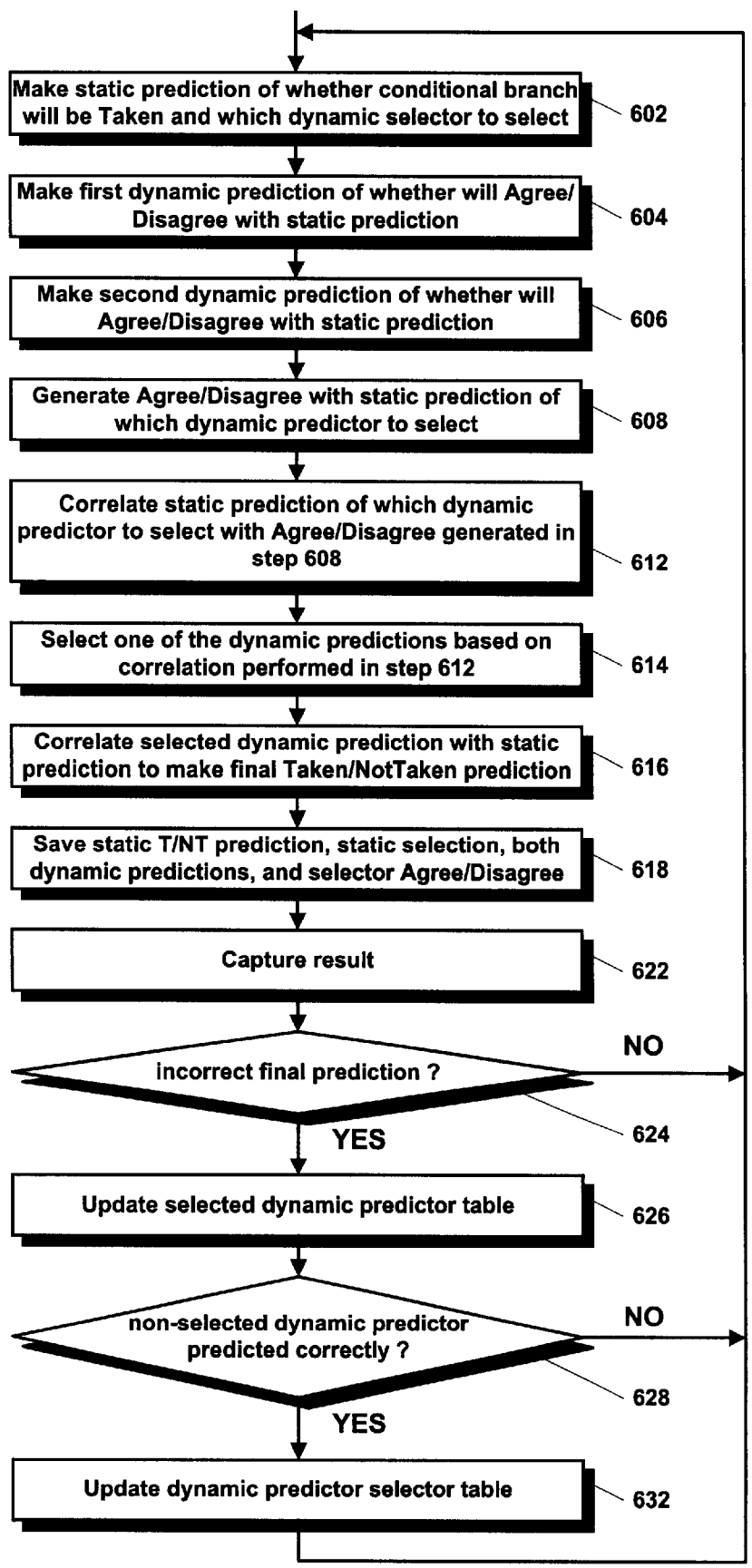
FIG. 6 is a flowchart illustrating operation of the branch prediction mechanism of FIG. 2 according to the present invention.

Referring now to FIG. 6, a flowchart illustrating operation of the branch predictor 103 of FIG. 2 is shown. Static predictor 222 makes a static prediction 264 of whether the conditional branch instruction will be taken or not taken, in step 602. Also, static predictor 222 makes a static prediction 284 of whether dynamic predictor X 202 or dynamic predictor Y 204 will correctly predict the outcome of the conditional branch instruction, in step 602.

Preferably, the static predictor 222 makes the static predictions based upon the test type and displacement sign of the conditional branch instruction, and the opcode of the instruction preceding the conditional branch instruction. The reader is referred to U.S. Pat. No. 6,421,774, entitled Static Branch Predictor Using Instruction Preceding Conditional Branch, having the same assignee and inventors, filed concurrently herewith, and hereby incorporated by reference, for a more detailed description of static branch prediction based upon a conditional branch instruction test type and displacement and preceding instruction opcode.

Dynamic predictor X 202 generates an Agree/Disagree prediction 242 of whether the static prediction 264 will be correct based on the contents of history table 302 in response to the conditional branch instruction address 188 and global history 232, in step 604. Dynamic predictor Y 204 generates an Agree/Disagree prediction 244 of whether the static prediction 264 will be correct in response to the conditional branch instruction address 188 and a portion of the global history 332, in step 606.

Dynamic predictor selector 212 generates an Agree/Disagree prediction 282 of whether static prediction 284 will be correct based upon the contents of history table 322 in response to conditional branch instruction address 188, in step 608. Correlator 287 correlates static prediction 284 with Agree/Disagree prediction 282 to generate selection signal 286 to control multiplexer 206, in step 612. Multiplexer 206 selects one of the dynamic predictions 242 and 244 based on selection signal 286, in step 614.

Correlator 208 correlates selected Agree/Disagree prediction 262 with static prediction 264 to make final prediction 189, in step 616. Branch predictor 103 stores prediction information 182 in PredInfo register 134 for later use in updating history tables 302, 304 and 322, in step 618. Preferably, prediction information 182 comprises static predictor 222 static predictions 264 and 284, dynamic predictor selector 212 prediction 282, dynamic predictor X 202 prediction 242 and dynamic predictor Y 204 prediction 244 stored in PredInfo register 134.

When the outcome, or result, of the conditional branch instruction is determined, the result is stored in result register 110, in step 622. Branch predictor 103 receives result 184 and prediction information 183 and determines if the final prediction was incorrect, in step 624. If the final prediction is correct, then no update of the history tables is performed and control returns to step 602.

If the final prediction is incorrect, then update logic 214 updates the history table that generated selected Agree/Disagree signal 262, in step 626. That is, update logic 214 updates either history table 302 or 304 depending upon which of Agree/Disagree predictions 242 and 244 were selected. Update logic 214 updates the selected history table by toggling the value generated at step 604 or 606 as described with respect to FIGS. 4 and 5.

Branch predictor 103 determines whether the non-selected one of dynamic predictor X 202 and dynamic predictor Y 204 correctly predicted Agree/Disagree with static prediction 264, in step 628. If the non-selected dynamic predictor did not correctly predict Agree/Disagree with static prediction 264, then no update of history table 322 is performed and control returns to step 602.

If the non-selected dynamic predictor did correctly predict Agree/Disagree with static prediction 264, then update logic 214 updates dynamic predictor selector 212 history table 322, in step 632. Update logic 214 updates history table 322 by toggling the value generated at step 608 as described with respect to FIGS. 4 and 5. Finally, control returns to step 602.

Figure 7:
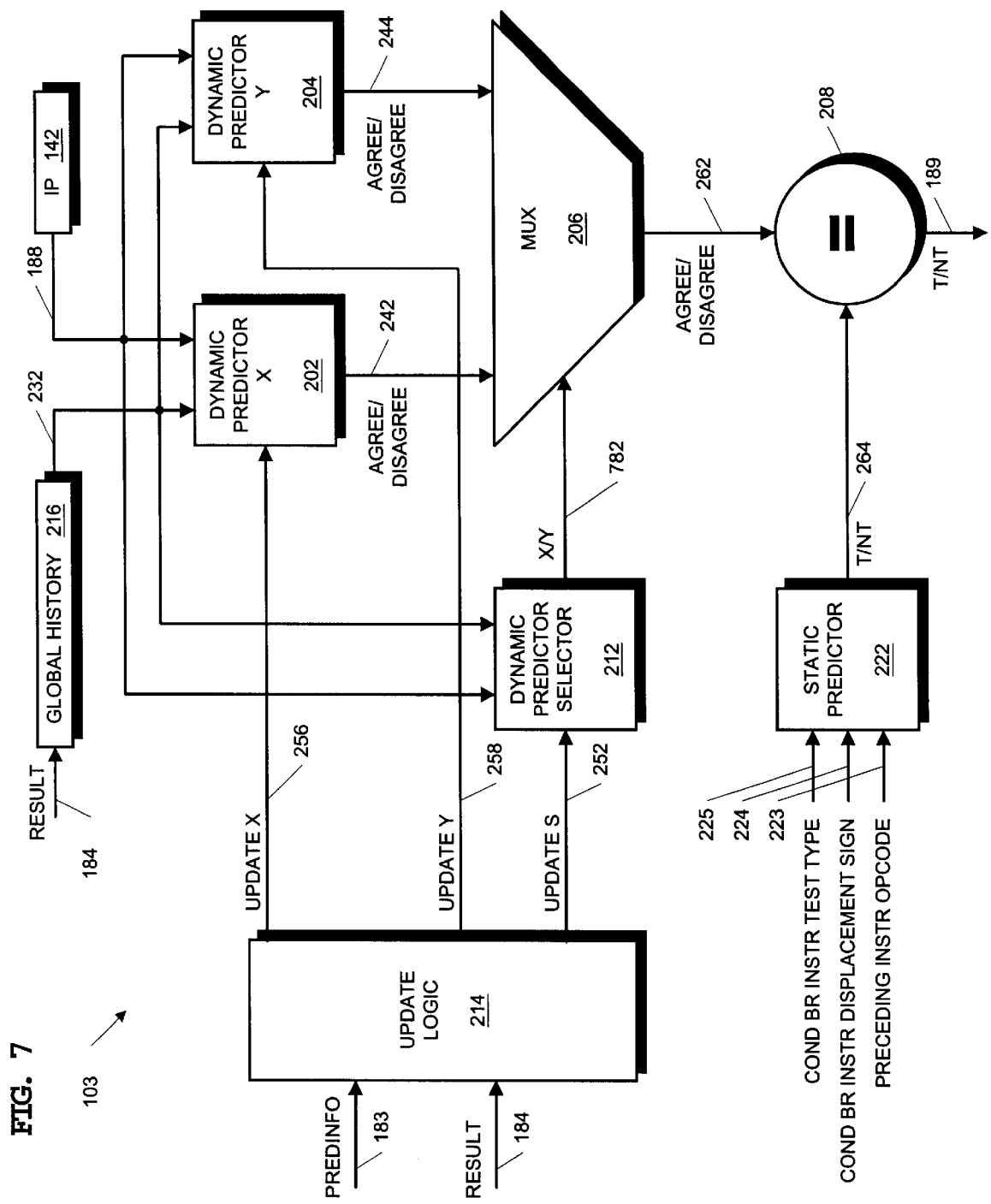
FIG. 7 is a detailed block diagram of the branch prediction mechanism of the microprocessor of FIG. 1 according to an alternate embodiment of the present invention.

Referring now to FIG. 7, a block diagram of branch predictor 103 of FIG. 1 according to an alternate embodiment of the present invention is shown. Branch predictor 103 of FIG. 7 is similar to branch predictor 103 of FIG. 2. However, dynamic predictor selector 212 generates an Agree/Disagree prediction 282 in the embodiment of FIG. 2, whereas dynamic predictor selector 212 generates an X/Y prediction 782 in the embodiment of FIG. 7 for directly controlling multiplexer 206, rather than indirectly in cooperation with static X/Y prediction 284, as in the embodiment of FIG. 2.

Thus, static predictor 222 of the alternate embodiment does not generate a static X/Y prediction 284 as does the embodiment of FIG. 2. Furthermore, the alternate embodiment does not include correlator 287 of FIG. 2. Additionally, update logic 214 of the alternate embodiment updates history table 322 of dynamic predictor selector 212 with an X/Y prediction on update S signal 252 rather than with an Agree/Disagree prediction.

The present inventors have observed that the embodiment of FIG. 2 produces slightly better branch prediction characteristics than the embodiment of FIG. 7. The present inventors have also observed that the embodiment of FIG. 7 has potentially better timing characteristics than the embodiment of FIG. 2 due to the absence of correlator 287 in a potentially critical timing path.

Referring now to FIG. 8, a table 800 illustrating operation of the update logic 214 of FIG. 7 is shown. Table 800 is similar to table 400. However, table 800 does not include a "STATIC PRED X/Y" column since static X/Y prediction 284 does not exist in the embodiment of FIG. 7. Furthermore, the "SELECTOR" column contains "X" and "Y" values to indicate whether the dynamic predictor selector 212 selects dynamic predictor X 202 or dynamic predictor Y 204, respectively, in its prediction 782, rather than Agree/Disagree.

Referring now to FIG. 9, a table 900 summarizing table 800 of FIG. 8 is shown. Similarly named columns correspond in FIGS. 8 and 9. FIG. 9 is similar to FIG. 5. However, table 900 does not include a "STATIC PRED X/Y" column since static X/Y prediction 284 does not exist in the embodiment of FIG. 7. Furthermore, the "SELECTOR" column contains "X" and "Y" values to indicate whether the dynamic predictor selector 212 selects dynamic predictor X 202 or dynamic predictor Y 204, respectively, in its prediction 782, rather than Agree/Disagree. As may be readily observed from tables 800 and 900, the update policy embodied in update logic 214 of FIG. 7 is similar to the update policy embodied in update logic 214 of FIG. 2. Namely, the update policy is according to the following two update rules. First, if the selected dynamic predictor incorrectly predicts the conditional branch instruction outcome, then the selected dynamic predictor is updated. Second, the selector 212 history table 322 is updated only if the selected dynamic predictor incorrectly predicts the outcome and the non-selected dynamic predictor correctly predicts the outcome.

For example, in line 27 of table 800, the dynamic predictor selector 212 selects dynamic predictor Y 204. Static prediction 264 predicts Not Taken and dynamic predictor Y 204 predicts Agree, i.e., that the conditional branch instruction will not be taken. However, the result is Taken. Therefore, the final prediction was incorrect. Hence, dynamic predictor Y 204 is updated with a Disagree value. In addition, dynamic predictor X 202 predicted Disagree, thereby correctly predicting the outcome. Hence, dynamic predictor selector 212 history table 322 is updated to indicate selection of dynamic predictor X 202 in a subsequent prediction since the selected dynamic predictor incorrectly predicted the outcome, whereas the non-selected dynamic predictor correctly predicted the outcome. Line 27 of table 800 is summarized in line 4 of table 900.

Figure 10:
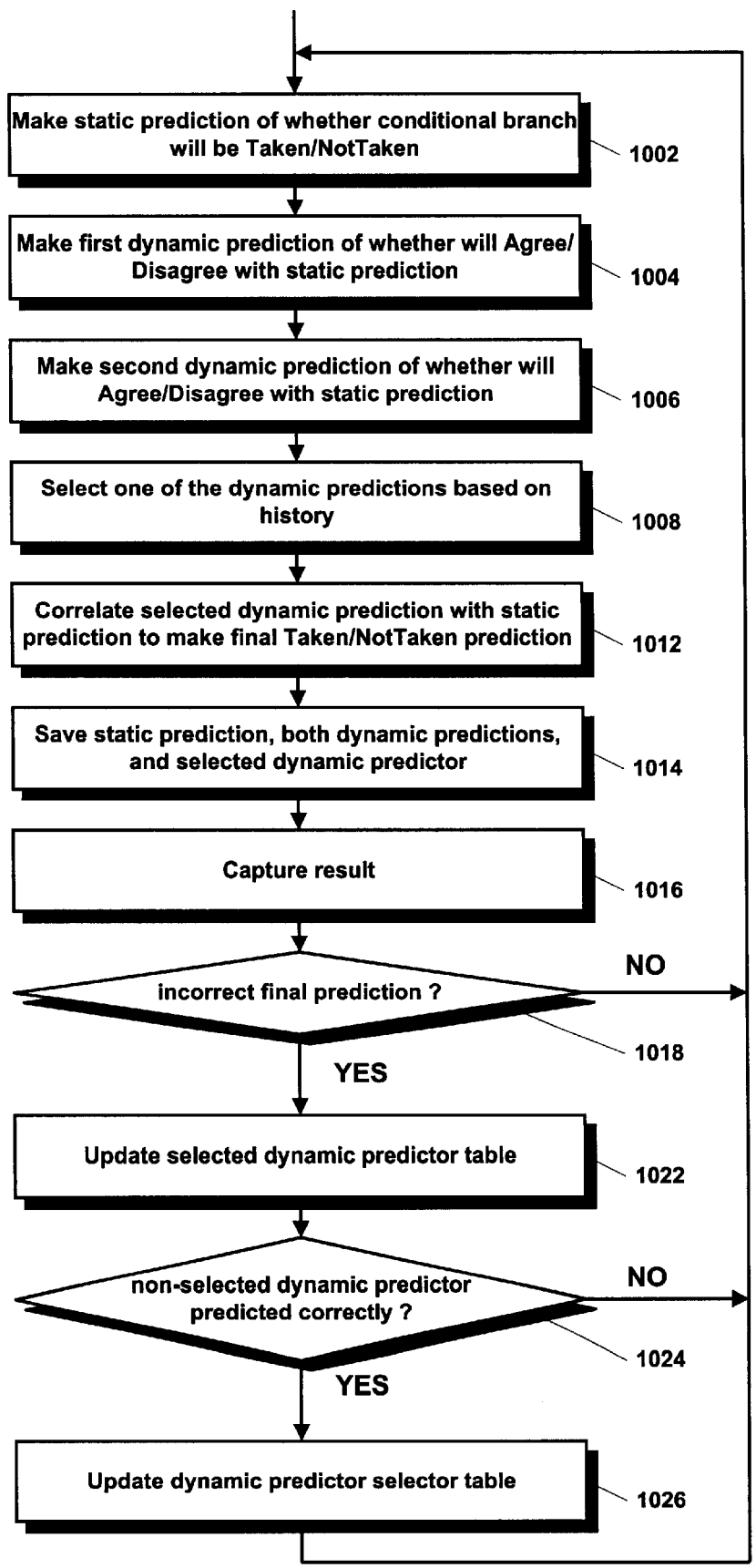
FIG. 10 is a flowchart illustrating operation of the branch prediction mechanism of FIG. 8 according to the alternate embodiment of the present invention.

Referring now to FIG. 10, a flowchart illustrating operation of the branch predictor 103 of FIG. 7 is shown. The static predictor 222 makes a static prediction 264 of whether the conditional branch instruction will be taken or not taken, in step 1002. Preferably, the static predictor 222 makes the prediction based upon the test type and displacement sign of the conditional branch instruction, and the opcode of the instruction preceding the conditional branch instruction.

Dynamic predictor X 202 generates an Agree/Disagree prediction 242 of whether the static prediction 264 will be correct based on the contents of history table 302 in response to the conditional branch instruction address 188 and global history 232, in step 1004. Dynamic predictor Y 204 generates an Agree/Disagree prediction 244 of whether the static prediction 264 will be correct in response to the conditional branch instruction address 188 and a portion of the global history 332, in step 1006.

Dynamic predictor selector 212 generates X/Y prediction 782, from history table 322 in response to conditional branch instruction address 188, used by multiplexer 206 to select one of dynamic predictor X 202 and dynamic predictor Y 204 to generate selected Agree/Disagree prediction 262, in step 1008. Correlator 208 correlates selected Agree/Disagree prediction 262 with static prediction 264 to make final prediction 189, in step 1012.

Branch predictor 103 stores prediction information 182 in PredInfo register 134 for later use in updating history tables 302, 304 and 322, in step 1014. Preferably, prediction information 182 comprises static predictor 222 static prediction 264, dynamic predictor selector 212 prediction 782, dynamic predictor X 202 prediction 242 and dynamic predictor Y 204 prediction 244 stored in PredInfo register 134.

When the outcome, or result, of the conditional branch instruction is determined, the result is stored in result register 110, in step 1016. Branch predictor 103 receives result 184 and prediction information 183 and determines if the final prediction was incorrect, in step 1018. If the final prediction is correct, then no update of the history tables is performed and control returns to step 1002.

If the final prediction is incorrect, then update logic 214 updates the history table that generated selected Agree/Disagree signal 262, in step 1022. Update logic 214 updates the selected history table by toggling the value generated at step 1004 or 1006 as described with respect to FIGS. 9 and 10.

Branch predictor 103 determines whether the nonselected one of dynamic predictor X 202 and dynamic predictor Y 204 correctly predicted Agree/Disagree with static prediction 264, in step 1024. If the non-selected dynamic predictor did not correctly predict Agree/Disagree with static prediction 264, then no update of history table 322 is performed and control returns to step 1002.

If the non-selected dynamic predictor did correctly predict Agree/Disagree with static prediction 264, then update logic 214 updates dynamic predictor selector 212 history table 322, in step 1026. Update logic 214 updates history table 322 by toggling the value generated at step 1008 as described with respect to FIGS. 9 and 10. Finally, control returns to step 1002.

Although the present invention and its objects, features, and advantages have been described in detail, other embodiments are encompassed by the invention. For example, variations of the method of employing the global branch history to index into the various branch history tables may exist. Additionally, various means of storing the prediction information may be employed in order to update the history tables. Variations on pipeline architecture exist, which combine some stages described in the present invention into a single stage, or separate one of the described stages into two or more stages. In addition, some of the microprocessor stages may be reordered as needed.

Those skilled in the art should appreciate that they can readily use the disclosed conception and specific embodiments as a basis for designing or modifying other structures for carrying out the same purposes of the present invention without departing from the spirit and scope of the invention as defined by the appended claims. For example,

We claim:

1. A branch prediction mechanism, comprising:
   a static predictor, for making a static prediction of whether a conditional branch instruction will be taken based on a test type of said conditional branch instruction;
   a multiplexer, having a selection input, configured to select one of two agree/disagree predictions;
   a selector, coupled to said multiplexer, for providing a selection signal to said selection input; and
   wherein said static prediction is correlated with said selected agree/disagree prediction to predict whether said conditional branch instruction will be taken.

2. The branch prediction mechanism of claim 1, wherein said static prediction of whether said conditional branch instruction will be taken is used as a final prediction to predict whether said conditional branch instruction will be taken if said selected agree/disagree prediction indicates agree.

3. The branch prediction mechanism of claim 1, wherein said selector provides said selection signal directly to said multiplexer selection input.

4. The branch prediction mechanism of claim 1, wherein said selector comprises a branch history table.

5. The branch prediction mechanism of claim 4, wherein said history table comprises an array of single bit storage elements for storing an indication of which of said two agree/disagree predictions correctly predicted a previous outcome of said conditional branch instruction.

6. The branch prediction mechanism of claim 5, wherein said array is indexed as a function of an address of said conditional branch instruction.

7. The branch prediction mechanism of claim 6, wherein said array is further indexed as a function of a portion of a global history of a plurality of conditional branch instructions executed by the microprocessor.

8. The branch prediction mechanism of claim 1, further comprising:
   a correlator, coupled to said static predictor, said selector and said multiplexer, wherein said selector provides said selection signal indirectly to said multiplexer selection input through said correlator.

9. The branch prediction mechanism of claim 8, further comprising:
   a static selector signal, generated by said static predictor, for selecting one of said two dynamic predictions based on said conditional branch instruction test type.

10. The branch prediction mechanism of claim 9, wherein said correlator is configured to receive said static selector signal and said selector signal, wherein said correlator is configured to treat said selector signal as an agree/disagree indicator with said static selector signal.

11. The branch prediction mechanism of claim 10, wherein said correlator forwards said static selector signal to said multiplexer input if said selector signal indicates agree and forwards an inverse of said static selector signal to said multiplexer input if said selector signal indicates disagree.

12. The branch prediction mechanism of claim 11, wherein said selector comprises a branch history table including an array of single bit storage elements for storing said agree/disagree indicator.

13. A method for updating a branch history table used in generating an agree/disagree signal for correlation with a static selection signal selecting one of two predictions of an outcome of a conditional branch instruction, the method comprising:
   receiving an indication of whether each of the two predictions correctly predicted the outcome; and
   updating the branch history table only if the selected one of the two predictions incorrectly predicted the outcome and the non-selected prediction correctly predicted the outcome;
   wherein said updating comprises storing an agree value in the branch history table if the branch history table generated disagree and storing a disagree value if the branch history table generated agree.

14. The method of claim 13, wherein the static selection signal is generated based upon an opcode of the conditional branch instruction.

15. The method of claim 13, wherein said opcode includes a test type specifying a condition upon which the conditional branch instruction will be taken.

16. The method of claim 13, further comprising:
   updating a second branch history table used in generating the selected one of the two predictions of the outcome of the conditional branch instruction if the selected prediction incorrectly predicted the outcome.

17. A branch prediction mechanism in a microprocessor, comprising:
   a static predictor, configured to generate a static prediction of an outcome of a conditional branch instruction based on a test type of said conditional branch instruction specifying a condition upon which said conditional branch instruction will be taken;
   first and second branch predictors, for generating first and second agree/disagree predictions with said static prediction;
   a selector, for selecting one of said first and second agree/disagree predictions; and
   correlation logic, configured to correlate said static prediction and a selected one of said first and second agree/disagree predictions selected by said selector.

18. The branch prediction mechanism of claim 17, wherein said correlation logic is configured to correlate said static prediction and said selected one of said first and second agree/disagree predictions by providing said static prediction as a final prediction of said outcome if said selected agree/disagree prediction indicates Agree, and to provide the inverse of said static prediction if said selected agree/disagree prediction indicates Disagree.

19. The branch prediction mechanism of claim 17, wherein said static predictor is further configured to generate said static prediction based on a sign of a displacement for calculating a target address of said conditional branch instruction in addition to said test type.

20. The branch prediction mechanism of claim 17, wherein said static predictor is further configured to generate said static prediction based on an instruction previous to said conditional branch instruction and said test type.

21. The branch prediction mechanism of claim 17, wherein said static predictor is further configured to generate said static prediction based on a sign of a displacement for calculating a target address of said conditional branch instruction.

22. The branch prediction mechanism of claim 17, wherein said first and second branch predictors each comprise a branch history table for storing a history of outcomes of conditional branch instructions.

23. The branch prediction mechanism of claim 22, further comprising:
history table update logic, coupled to said first and second predictors, for updating said branch history tables.

24. The branch prediction mechanism of claim 23, wherein said update logic updates one of said branch history tables which generated said selected agree/disagree prediction if said selected prediction incorrectly predicted said outcome.

25. The branch prediction mechanism of claim 23, wherein said selector comprises a branch history table for storing a history of outcomes of conditional branch instructions, wherein said history table update logic is further configured to update said selector branch history table if said selected agree/disagree prediction incorrectly predicted said outcome and a non-selected one of said first and second agree/disagree predictions correctly predicted said outcome.

26. The branch prediction mechanism of claim 25, wherein said history table update logic updates said branch history table by toggling an agree/disagree bit associated with said conditional branch instruction within said history table.

27. The branch prediction mechanism of claim 17, further comprising:
predictor selection logic, coupled to said selector, configured to receive said first and second agree/disagree signals and to select one of said first and second agree/disagree signals in response to said selector.

28. An apparatus for selecting one of two predictions of an outcome of a conditional branch instruction made by a branch prediction mechanism of a microprocessor, the apparatus comprising:
a history table, for storing a plurality of agree/disagree indications, configured to provide one of said plurality of agree/disagree indications on an output in response to an address of the conditional branch instruction; and
a correlator, coupled to said history table, for correlating a biasing bit signal generated by the branch prediction mechanism with said agree/disagree indication provided on said history table output to generate a selection signal for selecting one of the two predictions.

29. The apparatus of claim 28, wherein said correlator is configured to forward said biasing bit signal if said agree/disagree indication indicates agree and to generate an inverse of said biasing bit signal if said agree/disagree prediction indicates disagree.

30. The apparatus of claim 28, further comprising:
a static predictor, coupled to said correlator, for generating said biasing bit signal.

31. The apparatus of claim 30, wherein said static predictor generates said biasing bit signal based upon a test type specifying a condition upon which the conditional branch instruction will be taken.

32. The apparatus of claim 31, wherein said static predictor generates said biasing bit signal based upon said test type and upon a sign of a displacement for calculating a target address of the conditional branch instruction.

33. The apparatus of claim 31, wherein said static predictor generates said biasing bit signal based upon said test type and upon an opcode of an instruction preceding the conditional branch instruction.

34. The apparatus of claim 28, wherein said plurality of agree/disagree indications stored in said history table comprise indications of whether said biasing bit signal correctly selected the one of the two predictions for a previous execution of the conditional branch instruction.

35. The apparatus of claim 28, further comprising:
update logic, coupled to said history table, for updating said plurality of agree/disagree indications in said history table.

36. The apparatus of claim 35, wherein said update logic is configured to receive an indication of whether each of the two predictions correctly predicted the conditional branch instruction outcome, wherein said update logic is configured to update said history table if the selected one of the two predictions incorrectly predicted said outcome and a non-selected one of the two predictions correctly predicted said outcome.

37. The apparatus of claim 36, wherein said update logic updates said history table by changing said agree/disagree prediction to a value opposite its previous value.

38. An apparatus for selecting one of a plurality of predictions of an outcome of a conditional branch instruction, the apparatus comprising:
a static predictor, configured to receive a test type of a conditional branch instruction for specifying a condition upon which said conditional branch instruction will be taken and to generate a selection signal; and
a multiplexer, configured to select one of the plurality of predictions as a function of said selection signal.

39. The apparatus of claim 38, wherein said test type comprises an x86 conditional jump instruction test type.

40. The apparatus of claim 38, wherein said static predictor is further configured to receive a displacement sign of the conditional branch instruction and to generate said selection signal in response to said test type and said displacement sign.

41. The apparatus of claim 38, wherein said static predictor is further configured to receive an instruction previous to said conditional branch instruction and to generate said selection signal in response to said test type and said previous instruction.

42. The apparatus of claim 38, wherein the plurality of predictions comprises two predictions.

43. The apparatus of claim 42, further comprising:
a history table, for generating an agree/disagree signal based on a history of outcomes of said conditional branch instruction for indicating agree/disagree with said static predictor selection signal; and correlation logic, coupled to said static predictor, said history table and said multiplexer, configured to provide said selection signal to said multiplexer if said agree/disagree signal indicates agree and to provide an inverse of said selection signal to said multiplexer if said agree/disagree signal indicates disagree.

44. The apparatus of claim 43, further comprising:

update logic, coupled to said history table, configured to receive an indication of whether each of said two predictions correctly predicted the outcome;

wherein said update logic is configured to update the history table only if a selected one of said two predictions incorrectly predicted the outcome and a non-selected one of said two predictions correctly predicted said outcome.

45. The apparatus of claim 43, wherein said update logic is further configured to receive an indication of whether an agree or disagree was generated by said history table agree/disagree signal.

46. The apparatus of claim 45, wherein said update logic is further configured to update a history table generating said selected one of said two predictions if said selected one of said two predictions incorrectly predicted the outcome.

47. A method for selecting one of a plurality of predictions of an outcome of a conditional branch instruction by a branch prediction mechanism within a microprocessor, the method comprising:

receiving a test type of a conditional branch instruction specifying a condition upon which said conditional branch instruction will be taken; and selecting one of a plurality of predictions of an outcome of said conditional branch instruction based on said test type.

48. The method of claim 47, wherein said plurality of predictions comprises two predictions, wherein said selecting comprises:

generating a selection indication for indicating which of said two predictions to select based on said test type.

49. The method of claim 48, wherein said plurality of predictions comprises two predictions, wherein said selecting comprises:

generating an agree/disagree indication based on a history of outcomes of said conditional branch instruction.

50. The method of claim 49, wherein said plurality of predictions comprises two predictions, wherein said selecting comprises:

providing said selection indication if said agree/disagree indication indicates agree and providing an opposite of said selection indication if said agree/disagree indication indicates disagree.

51. The method of claim 48, further comprising:

updating said history of outcomes of said conditional branch instruction if a selected one of said two predictions incorrectly predicted said outcome and a non-selected one of said two predictions correctly predicted said outcome.

52. The method of claim 51, further comprising:

receiving a sign of a displacement for calculating a target address of said conditional branch instruction;

wherein said selecting comprises selecting one of said plurality of predictions based on said test type and said displacement sign.

* * * * *